United States Patent [19]

Eickelmann

[11] Patent Number: 4,890,001
[45] Date of Patent: Dec. 26, 1989

[54] ELECTRICAL CIRCUIT FOR SELECTIVELY ACTIVATING ELECTRICAL DEVICES

[75] Inventor: Lothar Eickelmann, Dortmund, Fed. Rep. of Germany

[73] Assignee: Hageag Holding Inc., Meggen, Switzerland

[21] Appl. No.: 312,608

[22] Filed: Feb. 17, 1989

[30] Foreign Application Priority Data

Feb. 18, 1988 [DE] Fed. Rep. of Germany ....... 3805013

[51] Int. Cl.⁴ ............................................. H01H 47/22
[52] U.S. Cl. ...................................... 307/38; 307/115; 361/169.1; 361/190; 361/193
[58] Field of Search ...................................... 307/34–41, 307/112, 140, 115; 361/160, 166, 167, 168.1, 169.1, 189, 190, 191, 192, 193

[56] References Cited

U.S. PATENT DOCUMENTS

| | | | |
|---|---|---|---|
| 2,709,773 | 5/1955 | Getting et al. | 307/115 X |
| 2,870,348 | 1/1959 | Chao | 307/115 X |
| 2,971,135 | 2/1961 | Ebert | 307/38 X |
| 3,231,786 | 1/1966 | Felcheck | 361/190 X |
| 3,311,795 | 3/1967 | Gilbert | 361/193 |
| 3,441,809 | 4/1969 | Newland | 361/193 |
| 3,469,151 | 9/1969 | Newland | 361/193 |
| 3,671,816 | 6/1972 | Ritzow | 361/193 |
| 3,691,431 | 9/1972 | Hendrickson et al. | 361/193 |
| 3,796,924 | 3/1974 | Fontana | 361/169.1 |

Primary Examiner—William M. Shoop, Jr.
Assistant Examiner—Paul Ip
Attorney, Agent, or Firm—Allegretti & Witcoff Ltd.

[57] ABSTRACT

An electrical circuit assembly for selectively activating one of numerous electrical devices. Each device having a corresponding pushbutton switch, wherein activation of the switch assigned to the selected device activates the selected device and deactivates a previously selected device.

5 Claims, 1 Drawing Sheet

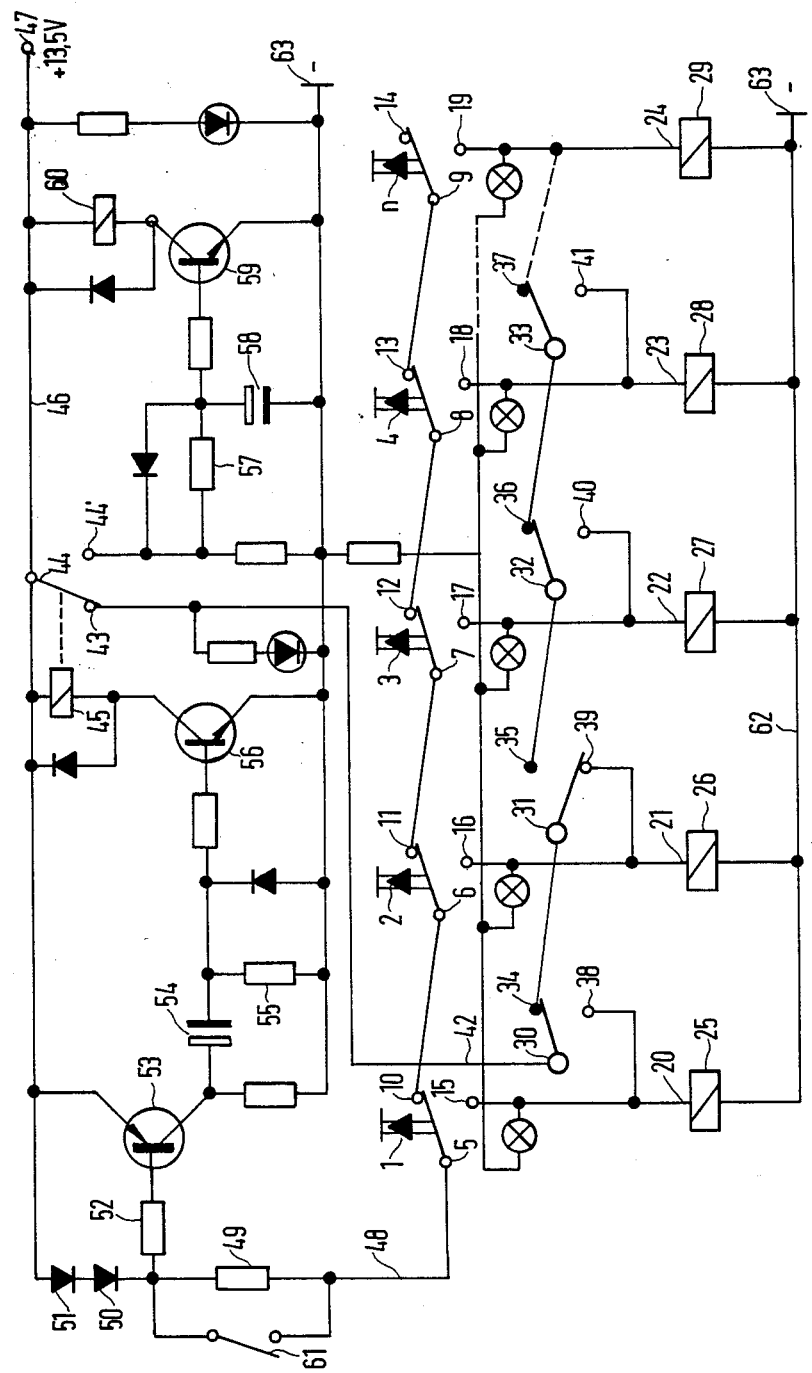

ELECTRICAL CIRCUIT FOR SELECTIVELY ACTIVATING ELECTRICAL DEVICES

BACKGROUND OF INVENTION

This invention relates to an electrical circuit assembly for selectively activating an array of electrical devices. The display type presentation of different devices such as various combinations of automobile radios and accessories has commonly been performed by switching-on and switching-off the devices from a common control panel.

The control panel becomes complicated when the switching is applied not only to power supply connections, but also to antennas, boosters, supplemental amplifiers, loudspeakers and the like. A particular difficulty arises by the fact that all lines must be connected to the control panel. An additional difficulty arises by the fact that measures must be taken to prevent the simultaneous activation of several devices or supplemental devices.

Previously, mechanical pushbutton switch strips have been employed for the purpose of activating one switch and deactivating a previously selected switch. However, the application of mechanical pushbutton strip switches is expensive.

SUMMARY OF THE INVENTION

Briefly, the present invention is drawn to an electrical circuit that performs the switching of various electrical devices by means of self-locking relays. The relays are brought into the self-locking position by means of corresponding pushbutton switches. Upon activation of a pushbutton switch, the circuit temporarily interrupts current to all of the relays in order to release the previously locked relays. The subsequent sustained supply of current to the relay selected by the corresponding pushbutton switch will effect self-locking of the relay.

Thus, it is an object of the present invention to provide a circuit assembly for the selective activation of various electrical devices that employs simple pushbutton switches having no reciprocal, mechanical locking mechanism.

Another object of the invention is to provide means for selectively activating an electrical device, wherein the device is activated by an electrically sustained self-locking relay upon activation of the corresponding pushbutton switch.

A further object of the present invention is to provide a circuit assembly for selectively activating various electrical devices wherein the pushbutton switches can be selectively positioned without great expense for electrical connecting lines.

A still further object of the present invention is to provide a circuit assembly for selectively activating various electrical devices wherein the relays activating the selected device may be located directly on the device to further economize the use of electrical connecting lines.

These and other objects, advantages and features of the present invention will be set forth in the detailed description which follows.

BRIEF DESCRIPTION OF THE DRAWING

In the detailed description of the invention, reference will be made to the drawing comprised of the following Figure:

FIG. 1 is an electrical schematic illustrating the electrical circuit assembly of the present invention.

DESCRIPTION OF THE PREFERRED EMBODIMENT

The invention will now be illustrated in greater detail by making reference to the circuit assembly depicted in FIG. 1. The circuit includes a plurality of pushbutton switches 1, 2, 3, 4, . . . n, each switch having a changeover contact 5, 6, 7, 8, 9, a rest contact 10, 11, 12, 13, 14, and an operating contact 15, 16, 17, 18, 19, respectively.

The circuit also includes a plurality of changeover switches having a changeover contact 30, 31, 32, 33, a rest contact 34, 35, 36, 37 and an operating contact 38, 39, 40, and 41. The operating contacts 38, 39, 40, and 41 are connected to a first connection 20, 21, 22, and 23 of a plurality of corresponding relay coils 25, 26, 27, and 28.

The rest contacts 34, 35, 36, and 37 are connected with adjacent changeover contacts 31, 32, and 33, so that, in the rest position, all of the changeover contacts 30-33 are connected in series. The changeover contact 30 is connected, by means of a line 42, to a rest contact 43 and a changeover contact 44. The changeover contact 44 is connected to a first, positive pole 47 of a direct current source by means of a line 46. The changeover contact 44 is actuated by a relay coil 45. The relay coils 25-29 are connected to a second, negative pole 63 of the direct current source by means of a line 62.

In the circuit position depicted in FIG. 1, the relay coil 26 is energized by current in the loop formed by the operating contact 39, the changeover contact 31, the rest contact 34, the changeover contact 30, the conductor 42, the rest contact 43, the changeover contact 44, the conductor 46, and the conductor 62 connected to the first positive pole 47 and the second negative pole 63 of the current source.

The changeover contact 5, of the pushbutton switch 1, is connected to the first positive pole 47 of the current source by means of a series connection of a conductor 48, a resistor 49, a pair of diodes 50 and 51, and the conductor 46. The first transistor 53 has a base that is connected between the resistor 49 and the diode 50 by means of a resistor 52. An emitter of the transistor 53 is connected to the conductor 46. A differentiating element is formed by connecting a capacitor 54 and a resistor 55 in series between a collector of the transistor 53 and the negative pole 63 of the current source. The output of the differentiating element, taken across the resistor 55, is applied to a base of a second transistor 56. A collector of the transistor 56 is connected to the positive pole 47 of the current source by means of the relay coil 45.

The operating contact 44', assigned to the relay coil 45, is connected to an RC-network comprised of a resistor 57 and a condensor 58. The output of the RC-network, taken across the capacitor 58 is applied to a base of a third transistor 59. A collector of the transistor 59 is connected to the positive pole 47 of the current source by means of a relay coil 60. The relay coil 60 includes an operating contact 61 connected in parallel to the resistor 49.

As previously stated, FIG. 1 depicts a circuit configuration that indicates that the relay coil 26 is energized and that the corresponding electrical device has thereby been activated. If it is desired to energize the relay coil 27, an operator would depress the pushbutton switch 3. Upon depressing the pushbutton 3, the changeover contact 7 is moved from the rest contact 12 to the operating contact 17 to form a current loop including the positive pole 47, the conductor 46, the diodes 50 and 51, the resistor 49, the changeover contact 5, the rest contact 10, the changeover contact 6, the rest contact 11, the changeover contact 7, the operating contact 17, the relay coil 27, the conductor 62 and the negative pole 63 of the current source. The resistor 49 limits the current to prevent the relay coil 27 from moving the changeover contact 32 from the rest contact 36 to the operating contact 40. However, the current creates a voltage drop across the diodes 50 and 51 which triggers the transistor 53, causing a change in voltage on the collector. The changing voltage is differentiated by the differentiator formed by the capacitor 54 and the resistor 55. The differentiated signal triggers the transistor 56 and energizes the relay coil 45. The relay coil 45 moves the changeover contact 44 from the rest contact 43 to the operating contact 44'. As a result, the current loop including the positive pole 47 of the direct current source, the conductor 46, the changeover contact 44, the rest contact 43, the changeover contact 30, the rest contact 34, the changeover contact 31, the operating contact 39, the relay coil 26, the conductor 62, and the negative pole 63 of the direct current source, is interrupted. The interruption of current through the relay coil 26 causes the changeover contact 31 to move from the operating contact 39 to the rest contact 35.

When the changeover contact 44 is moved from the rest contact 43 to the operating contact 44', a signal is applied to the RC-network formed by the resistor 57 and the capacitor 58. The signal triggers the transistor 59 causing the relay coil 60 to become energized. The relay coil 60 causes the operating contact 61 to close for a period of time determined by the time constant of the RC-network formed by the resistor 57 and the capacitor 58.

Since the pushbutton 3 is still depressed, the closing of the operating contact 61 provides lower resistance in the corresponding current loop. As a result, the current will be of sufficient size to energize the relay coil 27 to move the changeover contact 32 from the rest contact 36 to the operating contact 40, so that the relay 27 will remain energized.

The time constant of the RC-network formed by the resistor 57 and the capacitor 58 is shorter than the duration for which the pushbutton 3 is normally depressed. Thus, when the pushbutton 3 is released, the changeover contact 44 moves from the operating contact 44' to the rest contact 43, and a continuous current loop is established to maintain the relay coil 27 in an energized state.

The circuit configuration described is continued until another pushbutton is depressed. In the present case, depression of another pushbutton would repeat the process by denergizing the relay coil 27 due to the interruption of current in the changeover contact 44 and the rest contact 43, the operating relay 61 would close to provide sufficient relay coil current to move the changeover contact associated with the newly selected relay coil to the operating contact position until release of the selected pushbutton reestablishes the current in the changeover contact 44 and the rest contact 43 for maintaining the energization of the selected relay coil.

While there has been set forth a preferred embodiment of the invention, it is to be understood that the invention is to be limited only by the scope of the following claims and their equivalents.

What is claimed is:

1. An electrical circuit assembly for selectively activating one of various electrical devices, each device having a corresponding pushbutton switch, wherein activation of the pushbutton switch assigned to the selected device activates the selected device and deactivates a previously selected device, the circuit assembly comprising:

a plurality of pushbutton switches having a changeover contact, a rest contact, and an operating contact, the changeover contact of a first pushbutton switch being connected to a first pole of a direct current source;

a relay corresponding to each pushbutton switch, each relay having a relay coil, a changeover contact, a rest contact, an operating contact, and an additional contact for switching the electrical device, a first end of each relay coil being connected to the operating contact of the corresponding pushbutton switch and the operating contact of the relay, a second end of each relay coil being connected to a second pole of the direct current source, the changeover contact of a first relay being connected to the first pole of the direct current source by means of an additional relay;

a series resistance connected between the changeover contact of the first pushbutton switch and the first pole of the direct current source, the resistance being great enough to prevent sufficient current to activate the relay when activation of the pushbutton switch connects the changeover contact to the operating contact;

a differentiating device that differentiates a voltage dependant on the current through the series resistance and activates the additional relay for a short time to disconnect the direct current source from the relays for the short time; and a slow-release holding relay activated by the additional relay during the short time that the direct current source is disconnected from the relays, the slow release relay connecting the changeover contact of the first pushbutton switch directly to the direct current source by short circuiting the series resistance.

2. A circuit assembly for activating one of various electrical devices as claimed in claim 1 wherein the plurality of switches form a series connection with the first switch by connecting the rest contact of one switch to the changeover contact of an adjacent switch.

3. A circuit assembly for activating one of various electrical devices as claimed in claim 1 wherein the relays corresponding to the switches form a series connection with the first relay by connecting the rest contact of one relay to the changeover contact of a adjacent relay.

4. A circuit assembly for activating one of various electrical devices as claimed in claim 1 further comprising:

at least one diode connected in series between the series resistance and the first pole of the direct current source;

a first transistor having an emitter and base connected in parallel to the diode and having a collector connected to the second pole of the direct current source; and a CR-network forming the differentiating device, the CR-network being positioned between the collector of the first transistor and the second pole of the direct current source, the output of the CR-network being connected to a base of a second transistor, a collector of the second transistor being connected to the first pole of the direct current source such that a signal applied to the base of the second transistor will activate the additional relay.

5. A circuit assembly for activating one of various electrical devices as claimed in claim 1 wherein the additional relay applies a signal to an RC-network, the RC-network being connected to a base of a third transistor, the third transistor being connected between the first and second poles of the direct current source such that a signal applied to the base of the third transistor will activate the slow release holding relay.

* * * * *